Feb. 2, 1954  E. L. MARTIN ET AL  2,668,031
AIRCRAFT ARRESTING GEAR

Filed Sept. 13, 1950  3 Sheets-Sheet 1

Eric L. Martin &
John P. Fosness
*INVENTOR.*

BY *James M. Clark*

THEIR PATENT ATTORNEY.

Feb. 2, 1954  E. L. MARTIN ET AL  2,668,031
AIRCRAFT ARRESTING GEAR
Filed Sept. 13, 1950  3 Sheets-Sheet 2

Eric L. Martin &
John P. Fosness
INVENTOR.

BY *James M. Clark*

THEIR PATENT ATTORNEY.

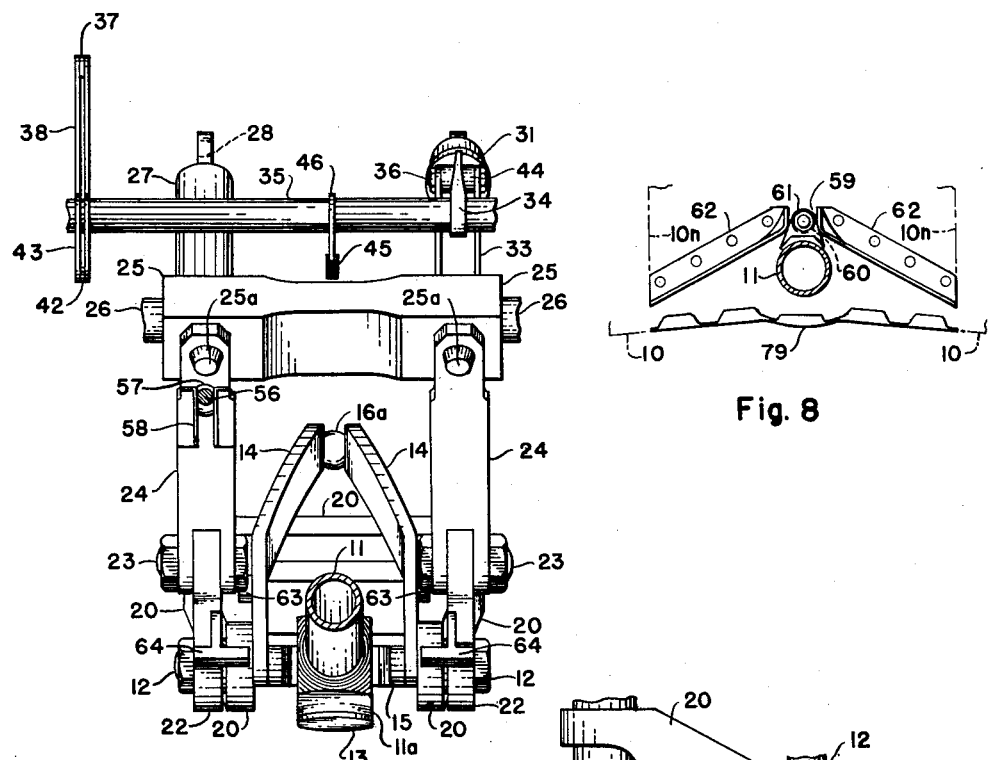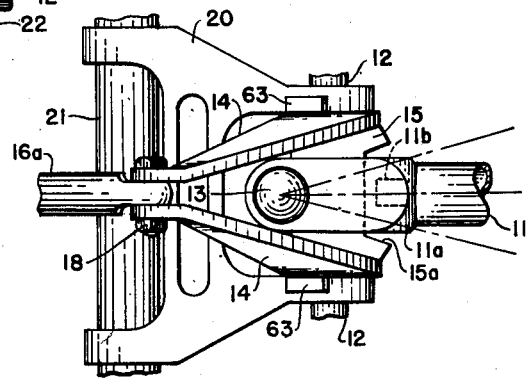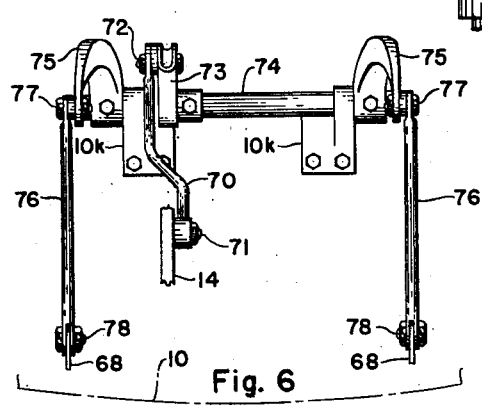

Patented Feb. 2, 1954

2,668,031

UNITED STATES PATENT OFFICE 2,668,031

AIRCRAFT ARRESTING GEAR

Eric L. Martin and John P. Fosness, Santa Monica, Calif., assignors to North American Aviation, Inc.

Application September 13, 1950, Serial No. 184,624

12 Claims. (Cl. 244—110)

This invention relates generally to aircraft and more particularly to improved retarding and restraining devices for the landing of aircraft such as arresting gears and their associated mechanisms.

The present invention is directed primarily to improved arrangements of arresting gears for aircraft of the carrier-based type, or other aircraft required to land within restricted areas, and relates more particularly to improvements in the mounting structure, actuating mechanism and the latching arrangements for retractable arresting hooks. It includes an improved interrelationship of these features as well as novel release, centering and resilient snubber and bumper means. In the design and operation of arresting gear arrangements, it is desirable that the pivot or trunnion about which the extended arresting hook is free to swing in all directions, be extended beyond the mold line or exterior of the aircraft fuselage and that it be retracted and stowed well within the fuselage outline such that it may reduce to a minimum any disturbances to the aerodynamic characteristics of the airplane upon which it is mounted. The present invention accomplishes this objective and also embodies an improved arrangement for providing the necessary "hold-down" force and snubbing action to the arresting hook with an improved mounting and actuating linkage arranged in such manner that the arresting hook is prevented from striking the fuselage or adjacent structure in any of the hook and supporting linkage positions. It also provides an improved fairing door arrangement which is extensible and retractable with the arresting hook.

The invention also includes improved arrangements whereby the arresting gear is either extended by manual actuation of a cockpit release handle or automatically extended in an emergency upon damage from gun-fire or accidental breakage of the cable from the cockpit. In either situation, the arrangement includes a spring-loaded bungee device which automatically causes extension of the arresting hook to its operative position in the event of failure in the actuation mechanism. The improved arrangement is also foolproof and positive-acting such that in the event the snubbing means should for any reason lose its "hold-down" pressure, the weight of the arresting hook will automatically carry the unit into its extended operative position ready for an arrested landing. The present invention also includes an improved arrangement of the actuating mechanism, mounting structure and latching devices such that positive projection of the hook into its operative position is accomplished in a foolproof and satisfactory manner under all flight and landing conditions from a retracted to an extended position of the arresting hook trunnion and both the actuating mechanism and the arresting hook are simultaneously latched in their retracted or stowed positions.

It is, accordingly, a major object of the present invention to provide an improved arresting gear arrangement for aircraft which is supported by an articulated mounting mechanism capable of housing the arresting hook within the fuselage and extending the same beyond the mold line thereof in the operative position of the hook. It is a further object to provide an improved actuating mechanism associated with the mounting or supporting structure which insures positive projection and foolproof operation of the arresting hook and its associated mechanism. A further object resides in the provision of an improved arresting gear installation in which the aerodynamic characteristics are preserved by an improved retraction arrangement of the arresting gear and its actuating mechanism and the fairing of the same in the stowed position. A corollary objective resides in the provision of fairing doors which are automatically operated to fair the arresting hook and its associated mechanism in both the extended and retracted positions of the hook.

It is a further object of the present invention to provide an arresting hook arrangement and an improved snubbing and "hold-down" means in operative engagement with the hook mounting mechanism for positively projecting the hook into its operative position and resiliently opposing its return toward the fuselage. It is a further object to provide a resilient bumper means for preventing damage to the aircraft structure as a result of the hook being thrown upwardly as might be created by its striking the landing surface, and in which condition the bumper also prevents inadvertent latching of the hook in its "up" position. A further object resides in the provision of suitable interconnected latching means for locking both the mounting mechanism and the arresting hook in their retracted positions, while simultaneously retracting the bumper stop into a position which permits full retraction of the hook. A further object includes provision of an improved release mechanism which also insures unlatching of the mechanism and positive extension of the hook in an emergency or upon damage to the release means. It is a still further object of this invention to provide an improved centering means for positioning the retracted arresting hook in its central position in which it will engage its locking mechanism and cause its fairing door to properly close the hook opening or well.

Other objects and advantages of the present invention will occur to those skilled in the art after reading the following description, taken in conjunction with the accompanying drawings forming a part hereof, in which:

Fig. 5 is an elevational view of the mechanism shown in Fig. 4 looking forward;

Fig. 6 is a similar elevational view of the forward fairing door operating mechanism;

Fig. 7 is a detail plan view as taken along the lines 7—7 of Fig. 3; and

Fig. 8 is a transverse sectional view of the centering arrangement for the arresting hook looking forward and as taken along the lines 8—8 of Fig. 2.

Figure 1:
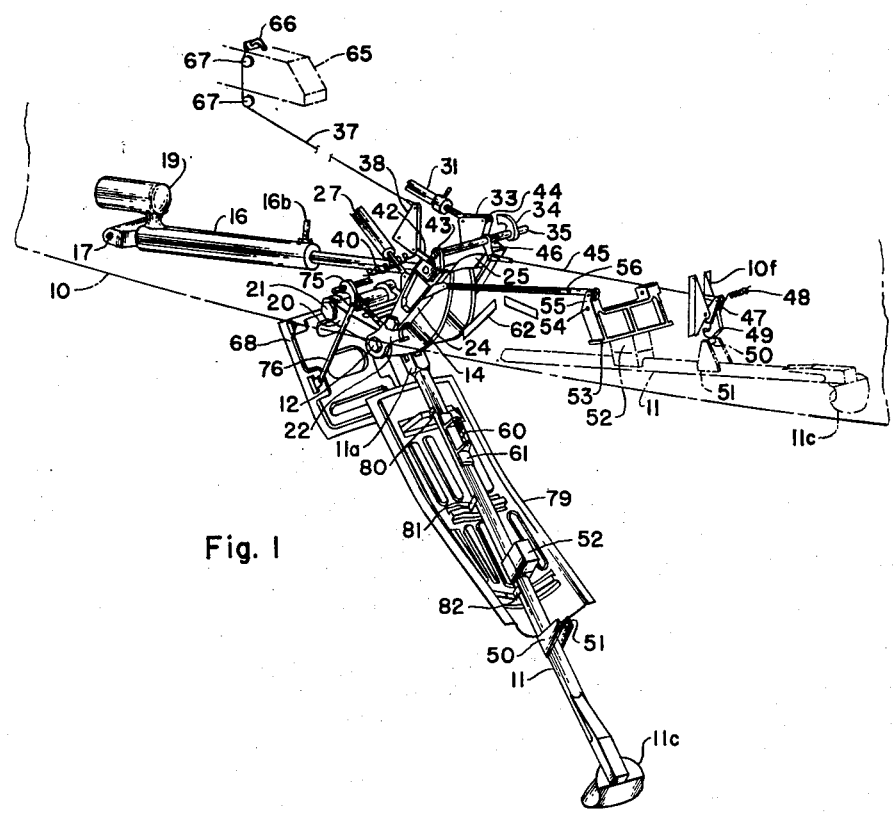
Fig. 1 is a perspective view of the aft portion of an aircraft fuselage showing the improved arresting gear installation and its associated mechanism with the fuselage outlined in phantom.
Figure 2:
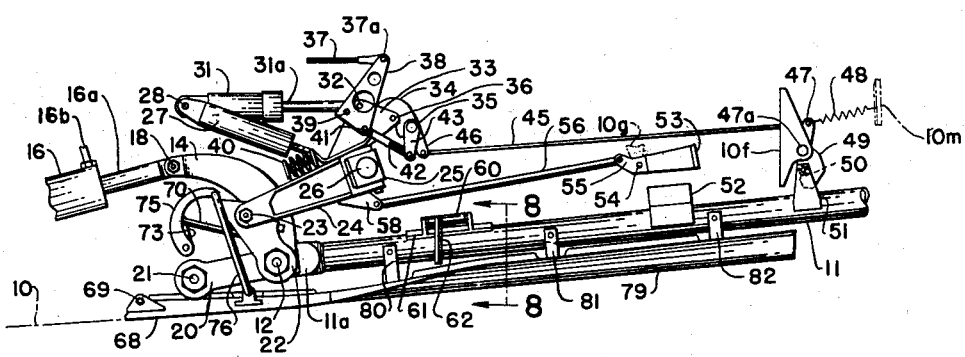
Fig. 2 is a side elevational view of the major portion of the installation shown in Fig. 1.
Figures 3, 4:
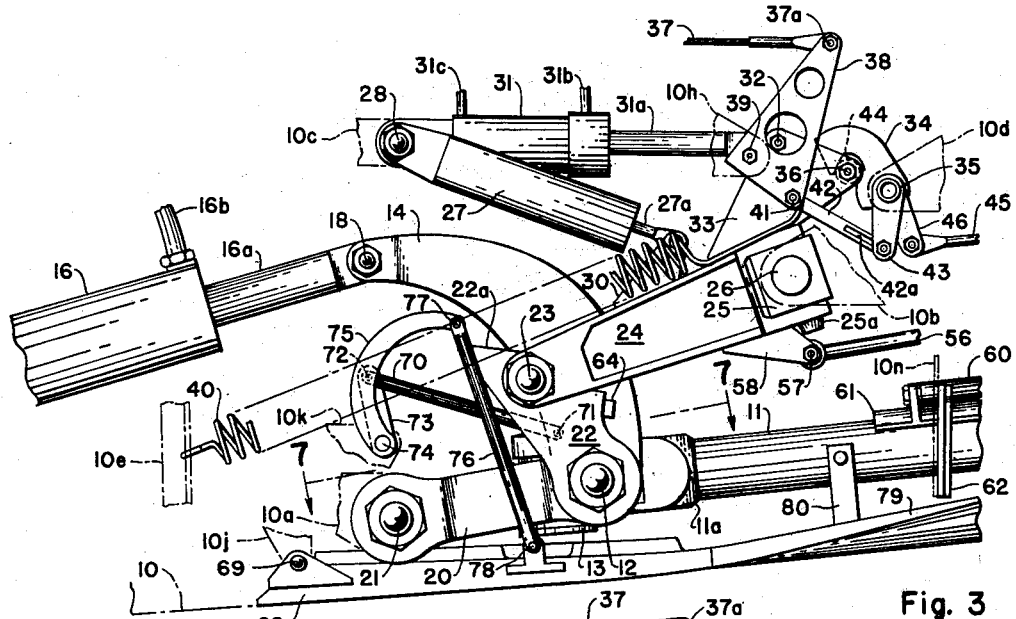
Fig. 3 is an enlarged elevational view of the hook mounting or support linkage and actuating mechanism shown in the retracted position of the hook and its associated mechanism.
Fig. 4 is a similar view of the same mounting structure and actuating mechanism in its extended position, but with the hook in its upwardly deflected position.

Referring now to Figs. 1 and 2, the broken outline indicated by the numeral 10 represents the lower after portion or mold line of the fuselage of an aircraft to which the present arresting gear installation has been applied. An arresting hook 11 comprising essentially a tubular shank portion to which is attached a forward terminal fitting 11a which is provided with a transverse bore to receive the trunnion pin 12, and the shank is also provided at its aft terminal with a hook fitting 11c suitably shaped and projected beneath the hook shank for engagement with the arresting means provided upon the deck of the carrier or other landing surface. The arresting hook 11 is accordingly free to pivot (within limits defined by certain stops and snubbing means to be more fully described) about the horizontal transverse axis of its pivot 12 which is capable of being extended from its stowed position of Fig. 2 within the fuselage 10 to its extended position below the fuselage mold line as indicated in Figs. 1 and 4. The axis of the pivot 12 is rotated from its retracted to its extended position about the axis of the pivot 21 supported upon the aircraft structure at 10a, and as defined by the bifurcated link member 20, and by supporting linkage and actuating mechanism to be described.

As will be noted from Figs. 4 and 7, the terminal 11a of the arresting hook 11 is also pivotally articulated by means of the vertical pivot 13 disposed slightly forward of the horizontal transverse pivot 12, the pivot 13 serving to mount the hook 11 upon the fitting 15 embracing the pivot 12 and disposed between the bifurcated portions of the link member 20. As shown in Fig. 7, the terminal fitting 11a of the hook 11 is provided with a tongue portion 11b, the opposite faces of which are arranged to limit the lateral pivotation of the hook 11 about the axis of the pivot 13 as these faces meet the stops 15a provided by the fitting 15. The latter fitting is provided with a pair of upwardly and forwardly extending curved arms 14 which form a bifurcated terminal for connection to the piston rod 16a of the combination hydraulic-pneumatic snubbing cylinder 16 by means of the pivot connection 18. The cylinder 16 is pivotally mounted at 17 upon the aircraft structure and is provided with an air-oil cylinder reservoir 19. The cylinder 16 normally tends to extend its piston rod 16a outwardly and rearwardly to thereby rotate the arresting hook 11 downwardly about the axis of its pivot 12 through the medium of the fitting 15, the arms 14 and the hook terminal 11a. The cylinder 16 provides a snubbing action by opposing upward deflection of the hook 11 and concurrent forward movement of the piston rod 16a. The cylinder 16 is provided with a suitable port 16b in communication with a source of hydraulic pressure which can be selectively actuated by the pilot or a ground crew member to overcome the snubbing pressure and to compact the cylinder and its piston rod 16a for upward rotation and retraction of the arresting hook 11 about its transverse axis 12. The cylinder 16 and its associated mechanism accordingly serves a dual purpose, first as an actuating means for extending the hook 11 and secondly as a snubber to overcome rebound effects such as would be created by the hook striking the landing surface. This provision is advantageous in preventing the hook from bouncing, which might result in its missing the cable members with which the hook is intended to engage.

As indicated above, the transverse shaft 12, upon which the hook is pivoted for swinging in the vertical sense (and with the assistance of the pivot 13 for swinging in the horizontal sense), this transverse pivot 12 is carried by the bifurcated link 20 pivotally mounted upon the aircraft structure at 10a whereby the pivot point for the hook may be lowered sufficiently to be positioned outside of or below the fuselage mold line indicated at 10. A pair of drag links comprising the break-link units 22 and 24 are provided on either side of the hook 11 and the fitting 15 for the support and extension of the pivot shaft 12. These break-links 22 and 24 are intermediately pivoted at 23 and the link 24 is pivotally mounted upon the aircraft structure at 10b to the transverse member 25 upon the horizontal pivot 26 by means of the attachment screws 25a. The break-links 22 and 24 are provided with an abutting surface 22a in their substantially aligned overcenter condition when the transverse shaft is extended below the fuselage and are adapted to fold or "break" upwardly and inwardly upon extension of the piston 31a of the retracting cylinder 31 into the retracted position of the transverse link 12 as shown in Fig. 3, the transverse member 25 serving to tie the upper break-link units together.

A compression bungee unit 27 pivotally attached at 28 to the adjacent aircraft structure 10c is also pivotally connected at 29 to its piston unit 27a and to the bracket 30 attached to the break-link 24 to assist in the extension of the arresting link assembly, thereby providing a positive means for insuring the intermediate break point pivot 23 of the break-links going past the dead center extending between the pivot 12 and the pivot 26, and retaining these break-links in the extended substantially aligned overcenter position. A similar bracket 33 is also attached nearer the upper terminal of the break-link 24 for the pivotal connection at 32 with the above-mentioned pivot 31a of the actuating or retracting cylinder 31. The latter is provided with fluid ports 31b and 31c through which hydraulic fluid in the desired direction is caused to flow to either extend or retract the piston 31a for rocking of the upper break-link unit 24 about the axis of its pivot 26. A latch 34 for the supporting and actuating mechanism is mounted upon the transverse torque shaft 35, which in turn is journalled for rotation within the fuselage structure brackets 10d. The latch 34, in rotating about the axis of the torque tube 35, is adapted to either engage or release the roller 44, which is pivotally carried at 36 upon the rearward terminal of the above-mentioned triangular bracket 33, and is arranged to retain the hook supporting structure and actuating mechanism in the retracted position as shown in Fig. 3.

Extension of the hook 11 is effected by means of the cable 37 which extends upward and forward to the aircraft cockpit, terminating in the handle 66 and the sheaves 67 supported upon the center console in the cockpit or other suitable support. The rear terminal of the cable 37 is pivotally connected at 37a to the triangular bell-crank lever 38, which in turn is pivotally mounted upon the aircraft structure at the bracket 10h by means of the pivot 39. A retaining tension spring 40 is attached to the bell-crank 38 at the pivotal connection 41 at the rear terminal of the spring 40 and the forward terminal is anchored to suitable aircraft structure as at 10e. An interconnecting link 42 is provided between the pivotal connection 41 on the bell-crank member 38 and the outer terminal of an arm 43 integral with the torque shaft 35 and the retaining latch 34 for effecting clockwise rotation of the torque shaft 35 and release of latch 34 upon forward pull of the cable 37, and counterclockwise rotation of the bell-crank 38 about its pivotal mounting 39, to thereby permit disengagement of the roller 44. Link 42 is provided with a slot 42a at the pivotal connection with the terminal of the arm 43 to provide a lost-motion means in the link 42 to permit the latch 34 to receive the roller 44 without actuation of the bell-crank 38, or the cockpit cable 37 attached thereto.

The latch for the foregoing linkage is interconnected to a further latch 49 for the arresting hook 11 by means of the cable 45 pivotally attached to a further arm 46 which is also integral with the torque shaft 35 and the retaining latch 34. The aft end of the cable 45 is connected to the arm 47 of the hook latch 49 which engages a roller 50 secured by the fitting 51 to the shank of the hook 11 whereby the latter is retained in its retracted position. The hook latch 49 is pivotally mounted upon the adjacent bracket 10f of the aircraft structure upon the pivot 47a and is resiliently urged into its clockwise or latching position by the tension spring 48 which is anchored at its aft terminal to the aircraft structure at 10m. This interconnection insures simultaneous action of both retaining latches, namely the latch 34 for retaining the support linkage and actuating mechanism for the pivot 12 in their retracted positions, and the latch 49 for retaining the aft portion of the hook 11 in its retracted position within the fuselage. To insure extension of the hook 11 to its full "down" position, as indicated in Fig. 1, even under emergency conditions, sufficient pressure is provided in the snubber cylinder 16 to force the hook 11 down and the stops 63 on the arms 14 are arranged to engage the lugs 64 on the members 22 of the break-link struts, to insure positive movement of the transverse pivot shaft 12 to the fully extended "down" position.

A bumper is provided at 52 upon the shank of the hook 11 for engagement by a stop 53 pivotally supported upon the fuselage structure at 10g by means of the pivot 54 to prevent damage to the structure (and in certain instances, also to the rudder of the aircraft), when the hook 11 is deflected upwardly while in its extended position. The stop 53 is rotatable or retractable about its pivotal mounting 54 by means of the bell-crank 55 and an interconnecting link 56 pivotally attached at its forward terminal 57 to the bracket 58 secured to the upper member 24 of one of the break-link strut units. This provides a bumper arrangement which is effective at all times except when the linkage which supports the arresting gear in the extending position is retracted to the position shown in Fig. 2, whereupon the stop 53 is retracted or swung out of the way to permit complete retraction of the hook 11 and engagement of its roller 50 with the latch 49.

In order that the arresting hook 11, as well as its fairing door 79, and associated mechanism, is retracted into its properly centered position in which the roller 50 may engage the latch 49, a centering arrangement is provided as indicated in Fig. 8. This comprises essentially a roller 60 pivotally mounted upon the hook 11 by means of the fitting 61 for rolling engagement with either of the inclined camming members 62 supported upon the aircraft structure as by the bulkhead or transverse wall 10n. The members 62 are inclined upwardly and inwardly providing a notch or central gap 59 at their adjacent upper ends within which the roller is adapted to guidingly roll and automatically seat in its upper centered position.

It is also essential, in the high speed aircraft to which arresting gears of the type disclosed are fitted, to provide suitable automatically operating fairing means to substantially eliminate drag or resistance in the fully retracted position of the arresting hook and to minimize to the greatest extent the drag and other disturbances to the aerodynamic characteristics of the aircraft during its operation while the arresting gear is in its extended operative position. The well or recess within which the present arresting hook and its associated mechanism is stowed upon retraction is protected by the fairing doors 68 and 79 which are abutting and substantially continuous in the retracted position as shown in Fig. 3, but which separate and are caused to move independently while the hook 11 is in the extended operative position as shown in Fig. 4. The forward fairing door 68 is pivotally mounted at 69 upon the aircraft supporting structure 10j and its aft portion is pivotally connected to the links 76 at the pivots 78, and at the upper pivots 77 of the links 76 to the arms 75.

The mechanism for actuating this forward fairing door 68 is more particularly shown in Figs. 3, 4 and 6, in which it will be noted that the curved and outwardly offset arms 75 are fixedly mounted upon the transverse torque tube 74 which in turn is journalled for rotation within the structural bracket 10k carried by the fuselage structure. A further arm 73 is fixedly attached to the torque tube 74, being pivotally connected at the pivot 72 to the link 70 which in turn is pivotally connected at the pivot 71 to one of the bifurcated arm portions 14 of the fitting 15. It will, accordingly, be noted that, as the break-link units 22 and 24 move from their broken position of Fig. 3 into their aligned overcenter position of Fig. 4, the clockwise rotation of the link 22 causes its lug 64 to move away from the stop 63 on the arm 14 as well as following movement of the arms 14 under the influence of the snubber cylinder 16, and the dropping of the hook 11 due to its own weight imparts clockwise rocking to the torque shaft 74 due to the interconnection of the link 70 and the arms 73 with the members 14. Accordingly, as the pivot fitting 15 and its arms 14 are caused to move downwardly upon extension of the transverse pin 12 from the retracted position in Fig. 3, to the extended position in Fig. 4, the pivotal connection 71 to the link 70 causes the latter to move rearwardly and downwardly and to impart clockwise rotation to the torque shaft 74, and through the intermediate arms 75 and the links 76 to push the aft portion of the forward fairing door 68 downwardly into the airstream to provide suitable clearance for the hook fitting 11a and to fair the associated supporting structure. The aft fairing door 79 is fixedly attached through the adjustable fittings 80, 81 and 82 to the shank of the arresting hook 11 such that the fairing door 79 moves both up and down and laterally with the hook 11, being centered in its proper retracted position with the hook 11 by means of the centering mechanism 60—61—62 described in connection with Fig. 8.

The operation of the improved arresting gear arrangement is as follows: The extension of the arresting gear is accomplished by either one of two different conditions. In the first case deliberate extension of the gear is accomplished by the pilot by pulling the handle 66 in the cockpit rearwardly, thereby causing forward pull on the cable 37 for rotating the bell-crank member 38 in the counterclockwise direction about its pivot 39 imparting concurrent clockwise rotation to the arm 43, the torque shaft 35 and the latch 34, thereby releasing the roller 44 on the pivot 36. This clockwise rotation of the torque shaft 35, however, causes concurrent forward pull on the cable 45 thereby also releasing the rear up-latch 49 permitting the hook 11 to drop of its own weight about the pivot 12. Release or unlatching of the roller 44 permits both the bungee unit 27 and the snubbing cylinder 16 to exert forces causing aligning rotation of the upper and lower break-links 24 and 22, respectively, in opposite directions about their respective pivots 26 and 12. The hold-down pressure in the snubber cylinder 16 forces the hook 11 down and the stops 63 on the arms 14 engaging the hook 11 carry the arms 22 and 24 of the break-link units down into their aligned extended overcenter position in which the intermediate pivot 23 is extended below and aft of the centerline interconnecting the axes of the pivots 12 and 26, and the links are held in this position by the rearward pressure exerted by the bungee unit 27. In the event, through some emergency the snubbing cylinder 16 should lose its hold down pressure, the weight of the hook 11 will carry the unit down into position for landing. In the second or emergency extension of the hook in which the cable 37 might suffer accidental breakage or may be affected by gun-fire, the bell-crank member 38 is rotated in the clockwise direction by means of the tension spring 40 thereby also imparting clockwise rotation to the torque tube 35 and release of both forward and aft up-locks 34 and 49, respectively.

The retraction of the hook from its extended position as shown in Fig. 1, is accomplished by pressing a suitable retraction button (not shown) one of which may preferably be located in the aircraft cockpit and another upon the fuselage where it may be operated by a member of the ground crew. Such buttons serve to electrically operate a solenoid valve allowing fluid under hydraulic pressure to go to both the snubbing cylinder 16 through its port 16b, as well as to the relocation or retraction cylinder 31 through its port 31c. The remote trunnion 12 is accordingly retracted upwardly about the axis of the forward pivotal support 21 as the retracting cylinder 31 overcomes the extensive force of the bungee unit 27, holding the links 22 and 24 overcenter, and retracts them until stopped and locked by the latch 34. At the same time, the fluid pressure entering the port 16b of the snubbing cylinder 16 overcomes the snubber return pressure and through the link arms 14 of the member 15 retracts the hook 11 which is centered during the last portion of its retraction by the camming elements 62 guiding the roller 60 into the central position within the notch 59. Simultaneously the bumper 53 is retracted ahead of the retraction of the hook 11 by means of the linkage 56 connected to the upper break-link 24.

It will, accordingly, be noted that the mechanism is so arranged or interlinked that no combination of hook and link positions is such that the bumper would be sufficiently retracted to allow the hook 11 to strike the aircraft structure, or the rudder. It will also be noted that a major problem overcome by the disclosed arrangement is the development of a positive-acting, foolproof mechanism for an arresting gear which provides when extended, a remote trunnion pivot point outside the mold line of the fuselage to which an arresting hook might be attached and allowed to swing unobstructed in all directions.

Other forms and modifications of the present invention, which may occur to those skilled in the art after reading the above description are intended to come within the scope and spirit of the present invention, as more particularly set forth in the appended claims.

We claim:
1. In an aircraft, an arresting hook having a pivotal mounting associated with its forward terminal, linkage means for supporting said arresting hook at its pivotal mounting in both retracted and stowed positions, retracting means operatively associated with said supporting linkage means for operating the same into a retracted position of said arresting hook, latch means for retaining said hook in its retracted position, and release means including a cable-operated spring-opposed bell-crank and a lost-motion device associated with said latch means arranged in such manner that either manual pull upon said cable or rupture of said cable automatically causes release of said latching means and extension of said arresting hook and its associated pivotal mounting into the operative position of said hook.

2. In an arresting gear for aircraft, an arresting hook, a pivotal mounting at the forward terminal of said arresting hook about which said hook may pivot for limited movements about transverse and vertical axes, a link having its forward terminal pivotally attached to the aircraft and having its rear terminal supporting said pivotal mounting for said arresting hook, break-link strut means pivotally attached to the aircraft structure at an upper terminal of said means for pivotally supporting at a lower terminal of said means said pivotal mounting of said arresting hook and said link, and extensible means operatively associated with said break-link strut means for breaking the same for upward rotation of said arresting hook about its said pivotal mounting at the rear terminal of said link for retraction of said arresting hook pivotal mounting within the aircraft.

3. In an arresting gear for aircraft, an arresting hook, a pivotal mounting at the forward terminal of said arresting hook about which said hook may pivot for limited movements about transverse and vertical axes, break-link strut means pivotally supported upon the aircraft structure for pivotally carrying said pivotal mounting of said arresting hook, actuating means operatively associated with said break-link strut for folding the same for upward rotation of said arresting hook about its said pivotal mounting for retraction within the aircraft and spaced simultaneously acting latching mechanism for locking said actuating mechanism and said arresting hook in their retracted positions.

4. In an arresting gear for aircraft, a mounting assembly comprising a plurality of pivotally interconnected links pivotally mounted upon the aircraft for limited rocking movements about a pair of spaced transverse axes, an arresting hook pivotally attached to said mounting assembly at one of said pivotal interconnections, said arresting hook including an articulated forward terminal pivotal about a vertical axis, and extensible means interposed between the aircraft structure and said pivotal mounting at the forward terminal of said arresting hook for rocking said mounting assembly about said spaced transverse axes into an operative position of both said mounting assembly and said arresting hook.

5. In an aircraft, a fuselage structure, a pair of pivotal mountings carried by said fuselage structure, supporting mechanism including an articulated linkage pivotally mounted upon said fuselage structure pivotal mountings, an arresting hook pivotally mounted upon one of the articulated pivots of said supporting linkage, actuating mechanism operatively associated with said supporting linkage for moving said linkage and said arresting hook pivotal mounting between retracted and extended positions, latch means for retaining said arresting hook in its retracted position, a resilient bumper carried by said arresting hook, retractable stop means carried by the fuselage structure normally in a position at which it is engaged by said arresting hook bumper in the extended operative position of the arresting hook and means operatively associated with said supporting linkage for retracting said stop means such that it cannot be engaged by said arresting hook bumper in the retracted position of said arresting hook.

6. In an arresting gear for aircraft, a mounting assembly comprising a plurality of pivotally interconnected links pivotally mounted upon the aircraft for limited rocking movements about a pair of spaced transverse axes, an arresting hook pivotally attached to said mounting assembly at one of said pivotal interconnections, said arresting hook including an articulated forward terminal pivotal about a vertical axis, extensible means interposed between the aircraft structure and said pivotal mounting at the forward terminal of said arresting hook for rocking said mounting assembly about said spaced transverse axes into an operative position of both said mounting assembly and said arresting hook, and means associated with said extensible means arranged to dampen upward rotation of said arresting hook while in its extended operative position.

7. In an aircraft arresting gear arrangement, an aircraft fuselage structure, a link element pivotally mounted at its forward terminal upon the fuselage structure, said link element having a pivot carried by its aft terminal, an arresting hook pivotally mounted upon said aft terminal pivot of said link element, a pair of pivotally interconnected links forming a break-strut, the outer terminal of a first of said break-strut links pivotally connected to said aft terminal pivot of said first link, the outer terminal of said second break-strut link pivotally carried upon the fuselage structure aft of and above the pivotal mounting of said first link and actuating means for moving said break-strut links into their aligned extended position in which straightening of said break-strut causes downward extension of said aft terminal pivot mounting at a point below the fuselage in the operative position of said arresting hook.

8. In an aircraft arresting gear arrangement, an aircraft fuselage structure, a link element pivotally mounted at its forward terminal upon the fuselage structure, said link element having a pivot carried by its aft terminal, an arresting hook pivotally mounted upon said aft terminal pivot of said link element, a pair of pivotally interconnected links forming a break-strut, the outer terminal of a first of said break-strut links pivotally connected to said aft terminal pivot of said first link, the outer terminal of said second break-strut link pivotally carried upon the fuselage structure aft of and above the pivotal mounting of said first link and actuating means for moving said break-strut links into their aligned extended position in which straightening of said break-strut causes downward extension of said aft terminal pivot mounting at a point below the fuselage in the operative position of the arresting hook, said link element extending downwardly and rearwardly toward said arresting hook pivotal mounting in its extended position and said break-strut links extending upwardly and rearwardly from said hook pivotal mounting in said aligned position in such manner that tension forces developed within said arresting hook during landing are transmitted through said link element to the fuselage structure at its forward terminal and is also transmitted as a compressive force through said aligned break-strut to said fuselage structure at said upper aftmost pivotal connection.

9. In an aircraft, a fuselage structure, a pair of spaced pivotal mountings carried by said fuselage structure, supporting mechanism comprising a series of three intermediately pivoted articulated links, the first and third links of said series separately pivotally mounted upon said aircraft structure at said spaced pivotal mountings, an arresting hook pivotally mounted at the first of said intermediate pivots of said supporting mechanism between said first and said second links, said second link attached to said first intermediate pivot, and retracting mechanism including a first piston cylinder assembly pivotally connected to a lever attached to said first intermediate pivot arranged to rotate said pivot and said second link for moving said supporting mechanism and said arresting hook pivotal mounting to a retracted position within said fuselage structure from an extended position external of said fuselage structure, said retracting mechanism including a second piston-cylinder assembly operatively connected to said third link for rotation about its said pivotal mounting.

10. In an aircraft, a fuselage structure, first and second pivotal mountings carried by said fuselage structure at longitudinally spaced positions, a break-strut linkage having an upper strut element pivotally mounted upon the first of said fuselage structure pivotal mountings, a link pivoted to the fuselage structure at the second of said pivotal mountings at the forward terminal of said link, said link pivotally connected to said lower break-strut element at the aft terminal of said link, an arresting hook pivotally mounted adjacent said aft terminal of said link and said lower break-strut element, said aft terminal of said link and said pivotal connection of said arresting hook normally disposed within said fuselage structure in the retracted position of said arresting hook, retracting mechanism including a pair of fluid-actuated cylinders operatively associated with said break-strut linkage, with said link and with said arresting hook for moving said arresting hook between an extended position in which said pivotal connection adjacent the aft terminal of said link is disposed externally of the fuselage structure and a retracted position within the fuselage structure, and means including upwardly converging guide elements carried by said fuselage structure engageable by said arresting hook during its retraction for centering said hook with respect to said fuselage structure.

11. In an aircraft, a fuselage structure, fore and aft spaced pivotal mountings carried by said fuselage structure, supporting mechanism including a break-strut assembly having a first element pivotally mounted upon said aft fuselage structure pivotal mounting, a longitudinally extending link pivotally mounted at one terminal to said forward fuselage structure pivotal mounting, the second element of said break-strut assembly pivotally connected to the remaining terminal of said longitudinally extending link, an arresting hook pivotally supported from the pivotal connection of said link and said second element, said pivotal connection of said arresting hook, said link and said second element normally disposed within said fuselage structure in the retracted position of said arresting hook, and retracting mechanism operatively associated with said supporting mechanism for straightening said break-strut assembly for the extension of said pivotal connection into the airstream beneath said fuselage structure for the extension of said arresting hook.

12. In an aircraft, a fuselage structure, a pair of pivotal mountings carried by said fuselage structure, supporting mechanism including an articulated linkage assembly pivotally mounted upon said fuselage structure pivotal mountings, two of the links of said assembly forming a break-link strut, an arresting hook mounted upon one of the articulated pivots of said supporting linkage, retracting mechanism including a piston-cylinder assembly and a lever operatively associated with one of said break links of said supporting linkage for moving said linkage and said arresting hook pivotal mounting between an extended and a retracted position, a spring-pressed latch automatically engageable with said supporting linkage in its retracted position, a further spring-pressed latch simultaneously engageable with said arresting hook in its retracted position, and means operatively interconnecting said supporting mechanism and both said latches for conditioning said latches upon extension of said arresting hook into its operative position.

ERIC L. MARTIN.
JOHN P. FOSNESS.

References Cited in the file of this patent
UNITED STATES PATENTS

| Number | Name | Date |
|---|---|---|
| 2,421,739 | Albright | June 10, 1947 |

FOREIGN PATENTS

| Number | Country | Date |
|---|---|---|
| 574,543 | Great Britain | Feb. 25, 1935 |